UNITED STATES PATENT OFFICE.

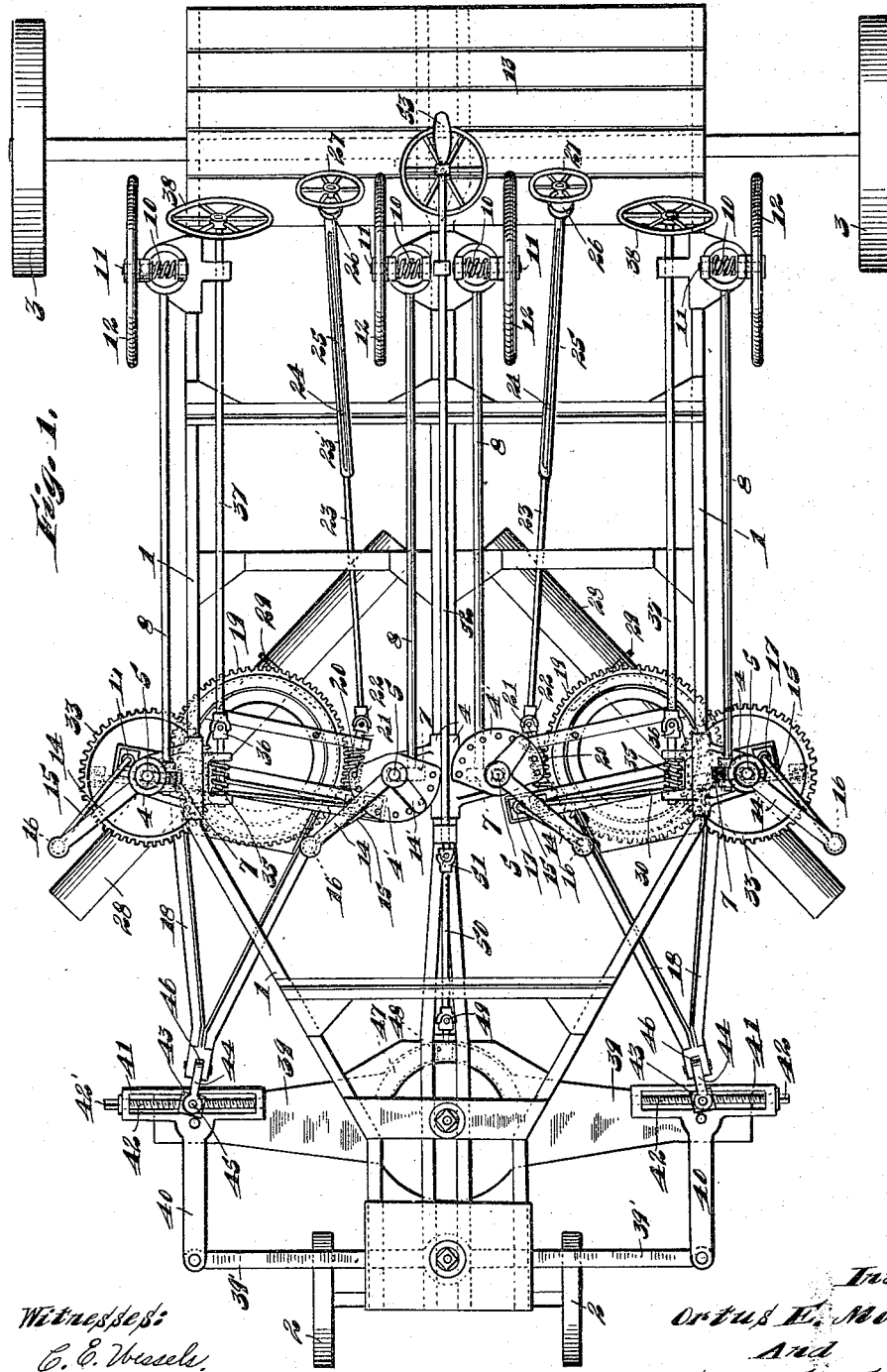

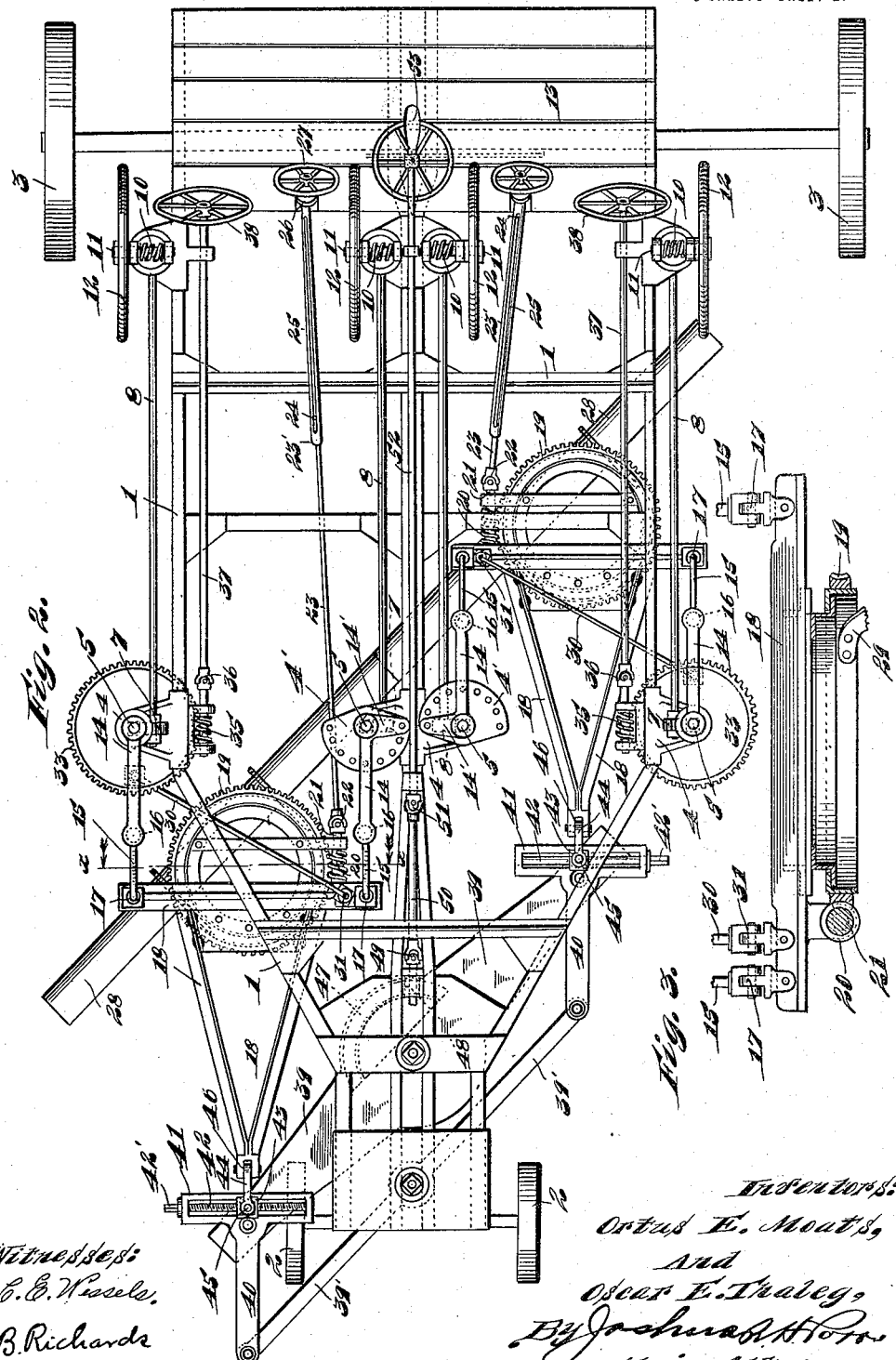

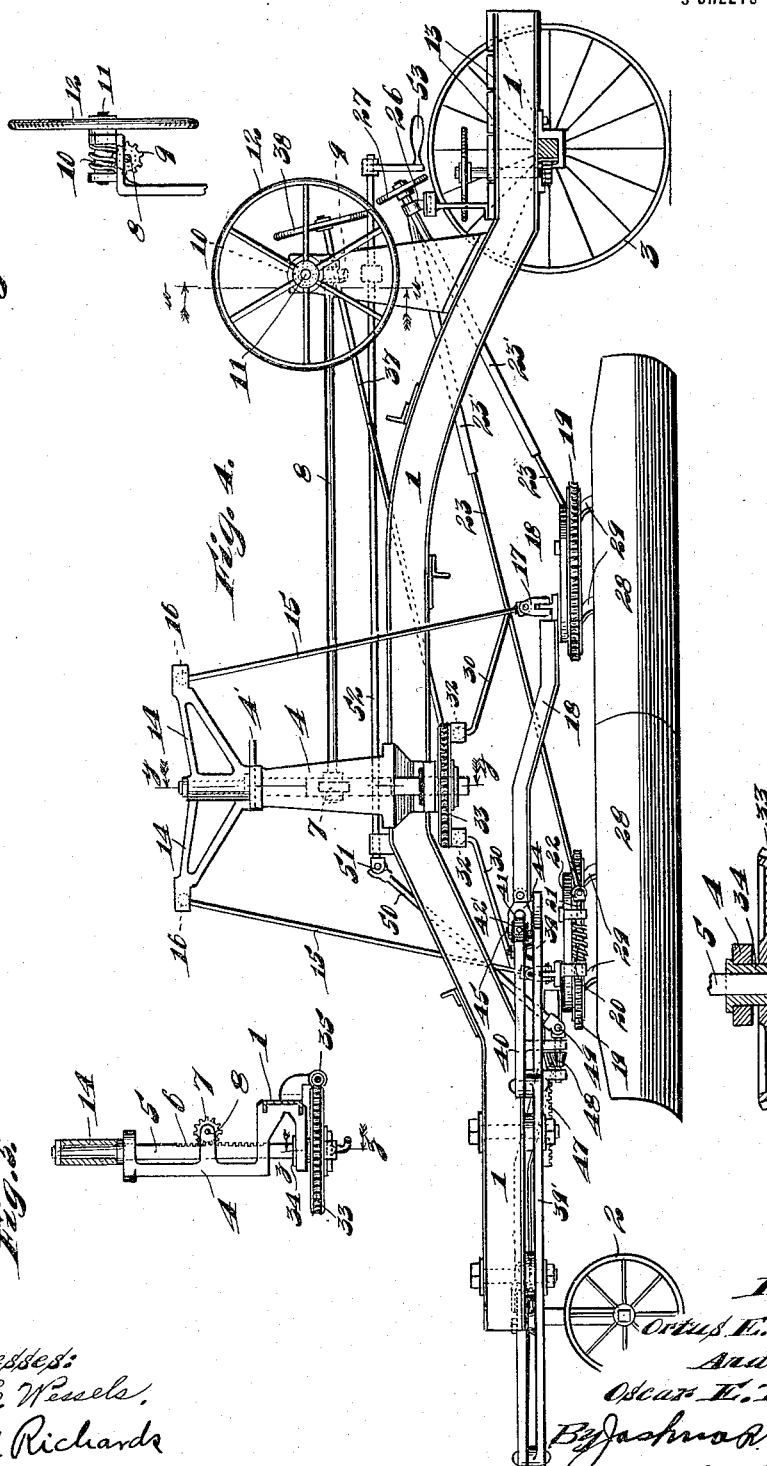

ORTUS E. MOATS AND OSCAR E. THALEG, OF CHICAGO, ILLINOIS.

ROAD-GRADER.

1,196,965.　　　　　Specification of Letters Patent.　　Patented Sept. 5, 1916.

Application filed November 24, 1913. Serial No. 802,809.

*To all whom it may concern:*

Be it known that we, ORTUS E. MOATS and OSCAR E. THALEG, citizens of the United States, and residents of the city of Chicago, county of Cook, and State of Illinois, have invented certain new and useful Improvements in Road-Graders, of which the following is a specification.

Our invention relates to improvements in road graders, and has for its object the provision of an improved machine of this character which is capable of a large variety of adjustments and hence capable of use for a large variety of operations, such as ditching, grading, scraping, leveling and the like.

A further object of the invention is to provide an improved machine of the character mentioned which is so constructed and arranged as to not be likely to become clogged with sand or grit and thus rendered inoperative, or operative only with great difficulty.

With these objects in view, the invention consists in the combinations and arrangements of parts hereinafter described and claimed.

The invention will be best understood by reference to the accompanying drawings forming a part of this specification, and in which, Figure 1 is a top plan view of a machine embodying our invention, Fig. 2, a similar view of the machine but showing the scraper blades adjusted to different positions, Fig. 3, an enlarged section taken on line *x—x* of Fig. 2, Fig. 4, a side view of the machine shown with one of the rear wheels removed, Fig. 5, a section taken on line *y—y* of Fig. 4, Fig. 6, an enlarged section taken on line *z—z* of Fig. 5, and Fig. 7, a section taken on substantially line *w—w* of Fig. 4.

The preferred form of construction as illustrated in the drawings comprises a frame 1 of any usual or desired construction and supported on forward wheels 2 and rearward wheels 3 mounted and arranged in any usual or desired manner. The specific form of the frame and the mounting of the wheels constitute no part of our present invention, and we make no claim thereto, any efficient form of frame and wheel construction being capable of efficient operation in conjunction with our invention.

The main frame of the machine is provided with four transversely alining standards or posts 4 arranged about the middle of the machine and square bars 5 are mounted to reciprocate vertically in standards 4 and provided with rack bars 6, as shown in Fig. 5. Each of the rack bars 6 meshes with a pinion 7 on the end of a shaft 8 mounted on the main frame of the machine and provided at its rear end with a worm wheel 9 meshing with a worm 10 on a shaft 11 provided with a hand wheel 12 arranged in operative relation with a platform 13 at the rear of the machine and upon which the operator stands in operating the machine. By this arrangement, it will be observed that by manipulating hand wheels 12, each of the bars 5 may be adjusted vertically independently of each other, and that said bars will be automatically locked in adjusted position by means of the interlocking action of the worm 10 with the worm wheel 9. A crane arm 14 is swiveled to the upper end of each of the bars 5 so as to turn freely thereon and the two inner crane arms 14 are provided with perforated locking arms 14' arranged to coöperate with perforated locking plates 4' provided on the upper ends of the corresponding standards 4 to permit of locking said crane arms in adjusted positions by inserting a pin or bolt through said perforations. Each of the crane arms 14 is provided with a depending swinging hanger 15 which is mounted at its upper end in the corresponding crane arm by means of a ball and socket joint 16 so as to be free to swing freely in any direction. At its lower end each of the hangers 15 on corresponding sides of the machine is connected by means of a universal joint 17 with the top of a blade supporting frame 18, so that two hangers support each of said frames, as shown. An annular worm wheel 19 is rotatably mounted on the bottom of each of the blade frames 18 and meshes with a corresponding worm 20 which is carried by shaft 21 mounted on the bottom of the corresponding frame 18. Each of the shafts 21 is connected by means of a universal joint 22 with the lower end of a shaft 23, said shaft 23 telescoping a hollow shaft 23' and carrying a pin 24 slidably engaging a slot 25 in shaft 23', as shown. Shaft 23' is mounted on the main frame of the machine in a bearing 26 which is free to swing in any direction, said shaft being provided with a hand wheel 27 in operative relation with platform 13 to facilitate manipulation thereof. Each of the worm wheels 19 carries a scraper blade 28 supported thereon by means of hangers 29. By this arrangement, it will be observed, that each of the scraper blades 28 may be rotated on the corresponding frame 18 so as to adjust the angular position of each of said blades relatively to the main frame of the machine, that such adjustments are possible in any position to which the frames 18 may be adjusted in frame 1 and that the interlocking action of the worms and worm wheels serves to lock said blades automatically in said adjusted positions.

An upwardly and outwardly extending link 30 is connected with the top of each of the frames 18 by means of a universally swinging joint 31 and at its other end by means of a ball and socket joint 32 with the under side of a worm wheel 33 arranged at the adjacent side of frame 1. Each of the worm wheels 33 is mounted upon a hollow sleeve 34 which is arranged in the lower portion of the corresponding standard 4 and is provided with a central opening adapted to permit the free passage of the corresponding bar 5. Each of the worm wheels 33 meshes with a worm 35 having a universal joint connection 36 with a shaft 37 provided with a hand wheel 38 adjacent platform 13. By this arrangement, it will be observed that each of the worm wheels 33 may be rotated independently of each other and that when so rotated will serve to adjust the frames 18 laterally with respect to frame 1 and that such adjustments may be made notwithstanding the fact that frame 18 may also be adjusted both vertically, longitudinally and laterally in frame 1.

A rocker beam 39 is pivoted centrally at the forward portion of frame 1 and coöperates with a bar 39' pivoted centrally, arranged parallel with said beam and connected thereto at its ends by means of links 40 pivoted to each, as shown. Each of the links 40 is provided with a transverse frame 41 in which is mounted a transverse screw 42 having an exposed squared end 42' for engagement by a wrench. By this arrangement, it will be observed that frame 41 and screws 42 will always remain in transverse relation to frame 1 notwithstanding the angular adjustments of rocker beam 39. Each of the screws 42 is provided with a threaded block 43 traveling thereon in frame 41 and each of the blocks 43 is provided with a link or yoke 44 pivoted at 45 thereto to swing horizontally. Each of the links 44 is pivoted at 46 to the forward end of the corresponding frame 18. By this arrangement, it will be observed that when rocker beam 39 is rocked, one of the frames 18 will be drawn forwardly, and the other rearwardly with respect to frame 1, and that the forward ends of said frame may be adjusted laterally, by means of threaded shafts 42, thus providing for different longitudinal and lateral positions of frame 18.

Rocker beam 39 carries a segmental crown or face gear 47 which meshes with a self-locking pinion 48 mounted on frame 1, as shown. Pinion 48 is operated by means of a universal joint 49, shaft 50, universal joint 51, shaft 52 and crank handle 53, as shown, and by means of which rocker beam 39 may be adjusted to and locked in any desired angular position and frames 18 correspondingly adjusted.

By the construction set forth, it will be observed, that the scraper blades 28 may be adjusted into a large variety of different positions so as to adapt them for performing a large variety of different operations under a large variety of different circumstances. Owing to the fact that all of the adjustments employed are swinging adjustments, the supporting bearings of the parts are comparatively small, and the turning leverage exerted thereon during adjustment, is comparatively great so that it is impossible for sand or grit in the bearings to materially interfere with the adjustments. The specific arrangement and form of parts disclosed will be found to be a simple and efficient one for the purpose.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variation and modifications as come within the scope of the appended claims.

Having described our invention what we claim as new and desire to secure by Letters Patent is:

1. A grader comprising a main frame; a crane arm mounted to swing on said main frame on a substantially vertical axis; a depending hanger mounted on said crane arm to swing freely in any direction; a blade frame pivotally connected with the lower end of said hanger; a blade on said blade frame; and means for adjusting said blade frame, substantially as described.

2. A grader comprising a main frame; a crane arm mounted to swing on said main frame on a substantially vertical axis; a depending hanger mounted on said crane arm to swing freely in any direction; a blade frame pivotally connected with the lower end of said hanger; a blade rotatably mounted on said blade frame; and means for adjusting said blade frame, substantially as described.

3. A grader comprising a main frame; a vertically adjustable crane arm mounted to swing on said main frame on a substantially vertical axis; a depending hanger mounted on said crane arm to swing freely in any direction; a blade frame pivotally connected with the lower end of said hanger; a blade on said blade frame; and means for adjusting said blade frame, substantially as described.

4. A grader comprising a main frame; a vertically adjustable crane arm mounted to swing on said main frame on a substantially vertical axis; a depending hanger mounted on said crane arm to swing freely in any direction; a blade frame pivotally connected with the lower end of said hanger; a blade rotatably mounted on said blade frame; and means for adjusting said blade frame, substantially as described.

5. A grader comprising a main frame; a crane arm mounted to swing on said main frame on a substantially vertical axis; a depending hanger mounted on said crane arm to swing freely in any direction; a blade frame pivotally connected with the lower end of said hanger; a blade rotatably mounted on said blade frame; and an extensible swinging shaft mounted on said main frame and said blade frame and connected to rotate said blade, substantially as described.

6. A grader comprising a main frame; a vertically adjustable crane arm mounted to swing on said main frame on a substantially vertical axis; a depending hanger mounted on said crane arm to swing freely in any direction; a blade frame pivotally connected with the lower end of said hanger; a blade rotatably mounted on said blade frame; and an extensible swinging shaft mounted on said main frame and said blade frame and connected to rotate said blade, substantially as described.

7. A grader comprising a main frame; a crane arm mounted to swing on said main frame on a substantially vertical axis; a depending hanger mounted on said crane arm to swing freely in any direction; a blade frame pivotally connected with the lower end of said hanger; a blade rotatably mounted on said blade frame; an extensible swinging shaft mounted on said main frame and said blade frame and connected to rotate said blade; a link pivotally connected with said blade frame; and means on said main frame for operating said link to adjust said blade frame, substantially as described.

8. A grader comprising a main frame; a vertically adjustable crane arm mounted to swing on said main frame on a substantially vertical axis; a depending hanger mounted on said crane arm to swing freely in any direction; a blade frame pivotally connected with the lower end of said hanger; a blade rotatably mounted on said blade frame; an extensible swinging shaft mounted on said main frame and said blade frame and connected to rotate said blade; a link pivotally connected with said blade frame; and means on said main frame for operating said link to adjust said blade frame, substantially as described.

9. A grader comprising a frame; a support mounted on said frame to swing on a substantially vertical axis; a depending hanger mounted to swing freely on said support; a blade frame on said hanger; and a blade rotatably mounted on said frame, substantially as described.

10. A grader comprising a frame; a support mounted on said frame to swing on a substantially vertical axis; a depending hanger mounted to swing freely on said support; a blade frame on said hanger; a blade rotatably mounted on said frame; an oscillatory member mounted on said frame on a substantially vertical axis; and a link connecting said oscillatory member with said blade frame, substantially as described.

11. A grader comprising a frame; a vertically adjustable support mounted on said frame to swing on a substantially vertical axis; a depending hanger mounted to swing freely on said support; a blade frame on said hanger; and a blade rotatably mounted on said frame, substantially as described.

12. A grader comprising a frame; a vertically adjustable support mounted on said frame to swing on a substantially vertical axis; a depending hanger mounted to swing freely on said support; a blade frame on said hanger; a blade rotatably mounted on said frame; an oscillatory member mounted on said frame on a substantially vertical axis; and a link connecting said oscillatory member with said blade frame, substantially as described.

13. A grader comprising a frame; a pair of coöperating supports mounted on said frame to swing on substantially vertical axes; a depending hanger mounted to swing freely on each of said supports; a blade frame on said hangers; and a blade rotatably mounted on said blade frame, substantially as described.

14. A grader comprising a frame; a pair of coöperating supports mounted on said frame to swing on substantially vertical axes; a depending hanger mounted to swing freely on each of said supports; a blade frame on said hangers; a blade rotatably mounted on said blade frame; an oscillatory member mounted on said frame on a substantially vertical axis; and a link connecting said oscillatory member with said blade frame, substantially as described.

15. A grader comprising a frame; a pair of vertically adjustable coöperating supports mounted on said frame to swing on substantially vertical axes; a depending hanger mounted to swing freely on each of said supports; a blade frame on said hangers; a blade rotatably mounted on said blade frame; an oscillatory member mounted on said frame on a substantially vertical axis; and a link connecting said oscillatory member with said blade frame, substantially as described.

16. A grader comprising a frame; a pair of vertically adjustable coöperating supports mounted on said frame to swing on substantially vertical axes; a depending hanger mounted to swing freely on each of said supports; a blade frame on said hangers; and a blade rotatably mounted on said blade frame, substantially as described.

17. A grader comprising a frame; a pair of vertically adjustable coöperating supports mounted on said frame to swing on substantially vertical axes; a depending hanger mounted to swing freely on each of said supports; a blade frame on said hangers; a blade rotatably mounted on said blade frame; an oscillatory member mounted on said frame on a substantially vertical axis; and a link connecting said oscillatory member with said blade frame, substantially as described.

18. A grader comprising a frame; two blades in said frame; a rocker beam on said frame; a bar pivoted to said frame parallel to said rocker beam; a pivoted link connecting each side of said bar with the corresponding side of said rocker beam; frames on said links; transverse screws in said link frame; blocks threaded on said screws; and a connection between each of said blocks and one of said blades, substantially as described.

In testimony whereof we have signed our names to this specification in the presence of the subscribing witness.

ORTUS E. MOATS.
OSCAR E. THALEG.

Witness:
B. G. RICHARDS.

Copies of this patent may be obtained for five cents each, by addressing the "Commissioner of Patents. Washington, D. C."